United States Patent
Kles (10) Patent No.: US 6,533,205 B1
(45) Date of Patent: Mar. 18, 2003

(54) FIBER OPTIC CABLE WINDING TOOL

(75) Inventor: Gary Kles, Sykesville, MD (US)

(73) Assignee: Stocker Yale, Inc., Salem, NH (US)

( * ) Notice: Subject to any disclaimer, the term of this patent is extended or adjusted under 35 U.S.C. 154(b) by 1 day.

(21) Appl. No.: 09/943,682

(22) Filed: Aug. 31, 2001

(51) Int. Cl.$^7$ .......................... B21C 47/02; B65H 75/24
(52) U.S. Cl. ............... 242/362; 242/573.5; 242/575.3; 242/577.4; 385/134
(58) Field of Search .................. 242/362, 362.2, 242/127, 571.6, 576, 577.3, 577.4, 575.3, 575.5, 573.4, 573.5, 366.1; 385/134, 135

(56) References Cited

U.S. PATENT DOCUMENTS

| | | | |
|---|---|---|---|
| 1,950,492 A | * 3/1934 | Holmes, Jr. | 242/575.3 |
| 2,297,648 A | * 9/1942 | Cushman | 242/573.5 |
| 2,557,510 A | * 6/1951 | Nau-Touron | 242/575.3 |
| 2,614,588 A | * 10/1952 | Laycock | 242/575.5 |
| 2,819,760 A | * 1/1958 | Norehad | 242/487.6 |
| 2,943,807 A | * 7/1960 | Loop | 242/573.4 |
| 4,369,818 A | * 1/1983 | Yoshida | 139/452 |
| 4,449,298 A | 5/1984 | Putz | |
| 4,643,369 A | 2/1987 | van Donk | |
| 4,850,544 A | 7/1989 | Snijders | |
| 5,409,179 A | * 4/1995 | Leclerc et al. | 242/573 |
| 5,448,931 A | 9/1995 | Fossella et al. | |
| 5,778,132 A | 7/1998 | Csipkes et al. | |
| 5,894,540 A | * 4/1999 | Drewing | 385/135 |

\* cited by examiner

Primary Examiner—Michael R. Mansen
(74) Attorney, Agent, or Firm—Connolly Bove Lodge & Hutz LLP (57) ABSTRACT

A fiber optic cable winding tool having concentric upper and lower disk-shaped bases that are rotatable relative to each other. Four quarter-circle spools are slidably mounted on the upper base, and are radially adjustable towards and from the central axis of the upper base via radial slots formed in the lower base. Each spool has a fiber optic cable contacting surface with a radius of curvature exceeding a minimum bend radius of the fiber optic cable. The radial slots communicate with corresponding arcuate slots formed in the lower base, and roller guides are provided through each radial slot and its corresponding arcuate slot and connects to a corresponding spool. When the upper and lower bases are rotated relative to each other, the spools move either towards or away from the central axis of the upper base, enabling a spool a diameter to be set. A thumb screw is also provided to bear against the rear base and maintain the desired diameter setting. The tool further includes a travel stop guide formed on the periphery of the upper disk-shaped base to prevent the upper and lower disk-shaped bases from rotating relative to each other, enabling predetermined diameters to be set. The radial and arcuate slots permit the spools to be radially collapsed towards the central axis of the upper disk-shaped base after winding the fiber optic cable to permit removal of the fiber optic cable from the spools.

16 Claims, 8 Drawing Sheets

FIBER OPTIC CABLE WINDING TOOL

BACKGROUND OF THE INVENTION

A. Field of the Invention

The present invention relates generally to the communications field, and, more particularly to a fiber optic cable winding tool for winding predetermined lengths of fiber optic cables and predetermined diameter coils of fiber optic cables used in the communications field.

B. Description of the Related Art

Most communication equipment is designed to be interconnected with communication cables having predetermined lengths. However, it is a problem in the field of communication cable installation to provide accurate predetermined lengths of communication cables without damaging the communication cables by the provision of tight bends, or inappropriate use of fasteners, or inadequate support to the communication cables. Such communication cables include conventional telephone cable having a plurality of copper conductors, coaxial cable, optical fiber, or the like. In all of these applications, the minimum radius of curvature of the communication cable is well defined, and bending the communication cable in a tighter bend can cause damage to the communication medium housed within the cable.

This problem is further heightened when fiber optic cables are used. Glass fibers used in such cables are easily damaged when bent too sharply and require a minimum bend radius to operate within required performance specifications. The minimum bend radius of a fiber optic cable depends upon a variety of factors, including the signal handled by the fiber optic cable, the style of the fiber optic cable, and equipment to which to fiber optic cable is connected. For example, some fiber optic cables used for internal routing have a minimum bend radius of 0.75 inches, and some fiber optic cables used for external routing have a minimum bend radius of 1.0 inches.

Damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent below its minimum bend radius, the greater the potential for breaking the fibers contained in the cable, and the shorter the life span of the cable.

For example, in a telephone switching office, the various switching components are split onto different printed circuit boards (PCBs). Fiber optic cables may be used to route the signals between the different PCBs or between components on a single PCB. In a conventional arrangement, the PCB is generally placed in a shelf or rack alongside other such PCBs.

The fiber optic cables are used for transferring signals between reception ports and electro-optical converters provided on the PCB or PCBs. Fiber optic cables generally come in three-foot and six-foot lengths with connectors provided at the ends thereof. However, the PCB may have a width of only several inches. Thus, the extra lengths of the fiber optic cables need to be stored on or near the PCB, using space in the optical communications equipment that is becoming more and more valuable as equipment becomes more densely packed. If the extra lengths of fiber optic cables are not stored, then they are susceptible to damage since they will freely hang in the equipment and may be pulled, snagged, or bent beyond their minimum bend radii.

Typically, pre-spooled fiber optic cable having a predetermined diameter is stored in cassettes containing optical communications equipment. For example, as shown in U.S. Pat. No. 5,778,132, assigned to the assignee of the present application, CIENA Corporation, depicts an amplifier module in FIG. 3 with parts separated to illustrate cassette construction and inter-engagement with adjacent cassettes. Each cassette includes a flat, tray-like base 111A, B, C, for receiving optical components and optical fiber. Cassette walls 112A, B, C define an interior curved surface which corresponds to a permissible bend radius for the optical fiber employed in the amplifier. A pair of retaining walls 123A, B, and C in each cassette define an outer track for fiber retention against the interior cassette walls and additionally serve to separate the fiber from other optical components within the cassette. Fiber retaining clips 115A, B, C extend from the cassette walls to assist in fiber guidance and organization within the cassette. Fiber guiding projections 116A, B, and C extend from the base of the cassette for directing the fiber toward the fiber retaining clips to further aid in fiber organization within the cassette, particularly for fibers which extend to or from optical components placed within the cassette. The configuration of the optical cassettes permits fiber to be wound within the cassette or, alternatively, pre-spooled fiber may be placed within the cassette and under the fiber retaining clips.

Devices that utilize pre-spooled fiber optic cable include erbium-doped fiber amplifiers (EDFA) and discrete Raman amplifiers. Such amplifiers utilize a length of fiber in which to amplify the optical signal. In the EDFA, this length of fiber is doped with Erbium. The discrete Raman amplifier typically utilizes a fiber type that is tuned or otherwise suitable for stimulated Raman scattering amplification. These and other devices often require a length of optical fiber that should be spooled in some fashion for the reasons discussed above.

The spool of fiber optic cable used by such devices preferably has a certain spool diameter because the spool may be housed in a package such as a cassette that has close tolerances. The close tolerances in such packages make installation and removal of pre-spooled fiber optic cables very difficult. Sometimes the spool diameter of the fiber optic cable needs to be increased or decreased depending upon its fit within the package (e.g. cassette). Furthermore, the device utilizing the fiber spool often needs a specific length of optical fiber (e.g. the EDFA typically uses a predetermined length of Erbium doped fiber to perform the amplification). Thus, the length of the fiber optic cable being spooled is typically set while the spool diameter may need to be varied depending upon the packaging of the fiber spool.

It is thus desirous to create spools of fiber optic cable having different diameters. Unfortunately, conventional fiber optic cable spoolers require a different, dedicated reel for each diameter desired. The operator or user of a conventional spooler spends valuable time setting up for different diameters of fiber optic cable. Furthermore, it is very difficult to remove spooled fiber optic cables from conventional spoolers, without damaging or destroying the fiber optic cable.

Thus, there is a need in the art to provide a means for providing multiple, accurate, predetermined lengths and spool diameters of fiber optic cable windings used in optical communications systems that may be quickly and easily utilized by an operator and prevent the fiber optic cables from being damaged or bent beyond their minimum bend radii.

SUMMARY OF THE INVENTION

The present invention solves the problems of the related art by providing a fiber optic cable winding tool for providing accurate predetermined lengths of fiber optic cables, and having a substantially circular winding drum or spool made up of peripheral elements that are radially adjustable to different diameters.

As embodied and broadly described herein, the present invention is broadly drawn to a fiber optic cable winding tool having concentric upper and lower disk-shaped bases that are rotatable relative to each other. Four quarter-circle spools are slidably mounted on the upper base, and are radially adjustable towards and from the central axis of the upper base via radial slots formed in the lower base. Each spool has a fiber optic cable contacting surface with a radius of curvature exceeding a minimum bend radius of the fiber optic cable. The radial slots communicate with corresponding arcuate slots formed in the lower base, and roller guides are provided through each radial slot and its corresponding arcuate slot and connects to a corresponding spool. When the upper and lower bases are rotated relative to each other, the spools move either towards or away from the central axis of the upper base, enabling a spool diameter to be set. A thumb screw is also provided to bear against the rear base and maintain the desired diameter setting. The tool further includes a travel stop guide formed on the periphery of the upper disk-shaped base to prevent the upper and lower disk-shaped bases from rotating relative to each other, enabling predetermined diameters to be set. The radial and arcuate slots permit the spools to be radially collapsed towards the central axis of the upper disk-shaped base after winding the fiber optic cable to permit removal of the fiber optic cable from the spools.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

As used herein, the term "winding" is used to mean winding, unwinding, securing, routing, and storing a fiber optic cable or cables, and also means a spool of a fiber optic cable or cables.

As used herein, the terms "fiber optic cable," "fiber," or "optical fiber" are used to mean various types of fiber optic cables such as fiber optic cables having or stripped of their protective sheaths.

Figure 1:
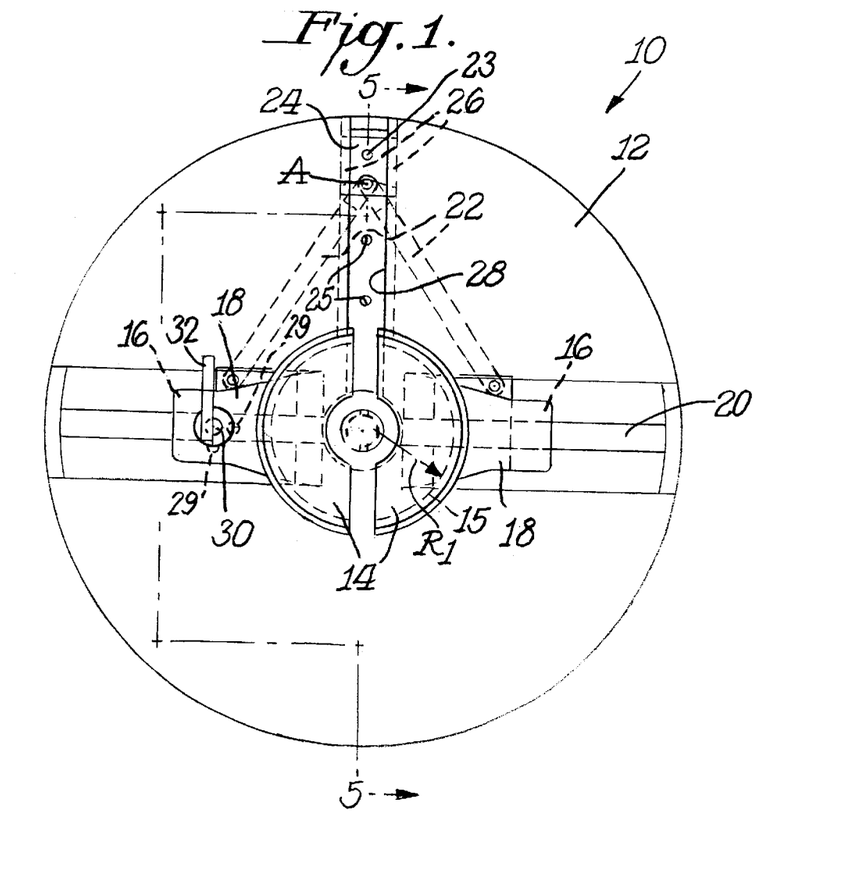
FIG. 1 is a top plan view of a fiber optic cable winding tool in accordance with a first embodiment of the present invention.

Referring now specifically to the drawings, an embodiment of the fiber optic cable winding tool of the present invention is illustrated in FIGS. 1–5, and shown generally as reference numeral 10. Fiber optic cable winding tool 10 includes a disk-shaped base 12 having a pair of semi-circular, opposing spools (hubs, jaws, reels, etc.) 14 moveably attached thereto with a pair of slide plate carriages 16. Each spool 14 may be attached to its corresponding slide plate carriage 16 via various connection mechanisms. For example, each spool 14 may connect to a corresponding slide plate carriage 16 with an adhesive, glue, double-sided tape, nuts and bolts, screws, etc. As shown in FIG. 1, however, each spool 14 may connect to a corresponding slide plate carriage 16 by integrally forming two connector arms 18 between each spool 14 and each slide plate carriage 16. A fiber optic cable to be wound on spools 14 may be attached to one spool (to begin the winding) with tape, adhesive, a threaded screw with a resilient washer, etc.

Figure 3:
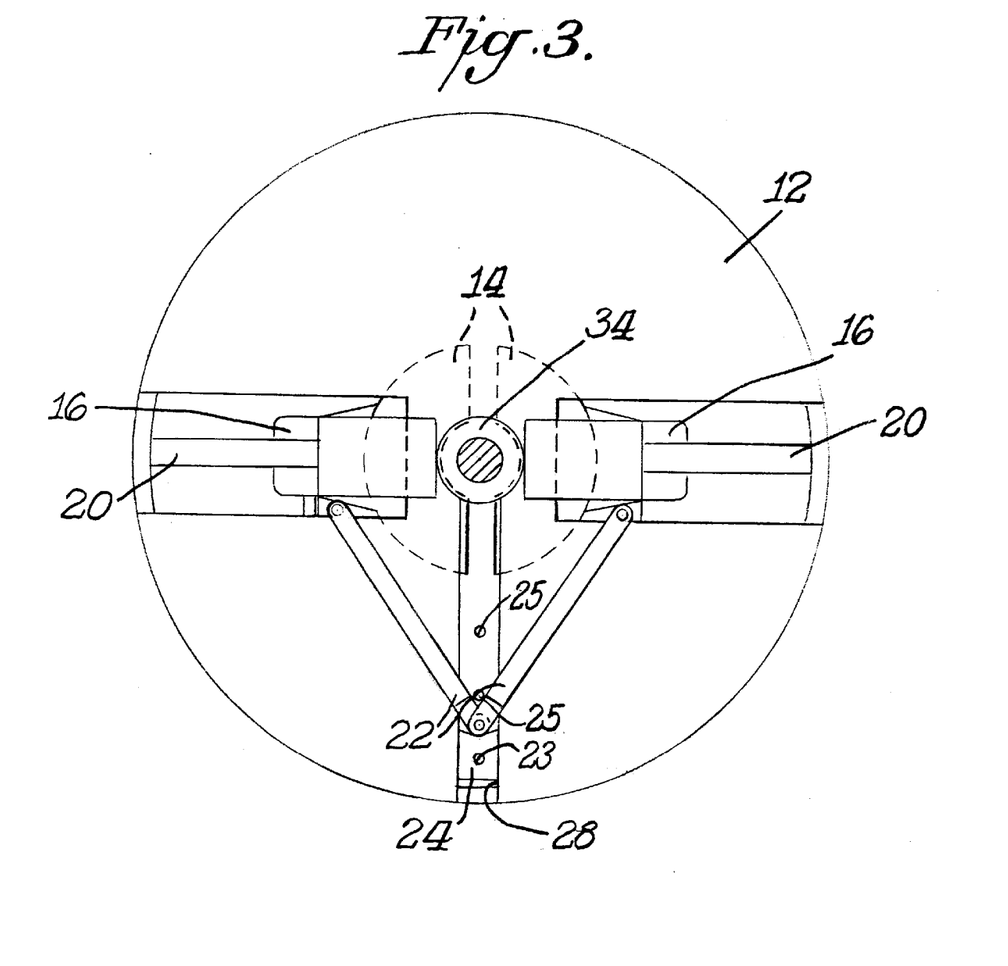
FIG. 3 is a bottom plan view of the fiber optic cable winding tool shown in FIGS. 1 and 2, and showing the fiber optic cable winding tool in a collapsed position.
Figure 5:
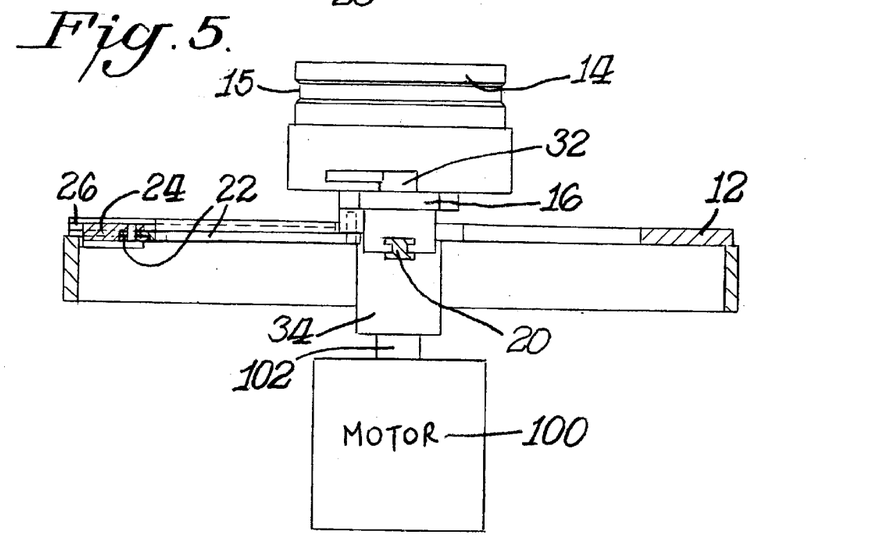
FIG. 5 is a cross-sectional view of the fiber optic cable winding tool shown in FIGS. 1–4, taken along line 5—5 of FIG. 1.

Each slide plate carriage 16 may slidably move towards and away from the other slide plate carriage 16 on a corresponding rail 20 (which may have an H-shaped or I-shaped cross-section, as best shown in FIG. 5). Rails 20 may be integrally formed or connect with the underside of disk-shaped base 12, as best seen in FIG. 3. If connected, rails 20 may attach to disk-shaped base 12 with a variety of connection mechanisms, including adhesive, glue, double-sided tape, nuts and bolts, screws, etc.

One end of a linkage arm 22 pivotally connects to one slide plate carriage 16, while one end of another linkage arm 22 pivotally connects to the other slide plate carriage 16. The ends of the linkage arms 22 not connected to slide plate carriages, pivotally connect at a common point "A" of a T-shaped slide block 24. T-shaped slide block 24 has two guide portions 26 (making up the top of the "T" of block 24) that are slidably received in a T-shaped slot 28 formed in disk-shaped base 12. Linkage arms 22 and T-shaped slide block 24 retain slide plate carriages 16 on their corresponding rails 20, and prevent carriages 16 from extending beyond the ends of rails 20 near the periphery of disk-shaped base 12, as shown in FIG. 3.

As further shown in FIG. 1, a lock bolt 30 and a lock arm 32 combination may be provided on one slide plate carriage 16. When lock arm 32 is rotated to a predetermined location, lock bolt 30 bears against rail 20 and prevents carriage 16 from sliding on rail 20. Lock bolt 30 may also contain a detent mechanism 29,29' that engages carriage when lock arm 32 is rotated to the predetermined location, and prevents lock bolt 30 from rotating. A user of the fiber optic cable winding tool 10 need only slide the carriage 16 containing lock bolt 30 and lock arm 32 to a desired location, which, in turn, causes the linkage arm 22 connected to this carriage 16 to force and slide T-shaped slide block 24, forcing and sliding the slide plate carriage 16 not containing lock bolt 30 and lock arm 32. By way of example only and assuming spools 14 are aligned near the center of disk-shaped base 12, if the user moves either slide plate carriage 16 outward from the center towards the periphery of base 12, then the linkage arm 22 connected to the moved carriage 16 will force T-shaped slide block 24 inward towards the center of base 12, causing the other linkage arm 22 to force the other carriage 16 outward towards the periphery of base 12. This way, spools 14 are radially adjustable towards and away from each other on base 12.

Once the user is satisfied with the diameter created by spools 14, he or she need only turn lock arm 32 to the predetermined location. Once lock arm 32 is rotated to its predetermined position, the detent mechanism 29, 29' in lock bolt 30 engages carriage 16, lock bolt 30 retains and prevents slide plate carriage 16 from sliding on rail 20, and linkage arms 22 prevent the other carriage 16 and T-shaped slide block 24 from sliding any further. Thus, linkage arms 22 retain the desired diameter of spools 14. Preferably, linkage arms 22 have the same length so that carriages move away from the center of base 12 an equal distance. However, linkage arms 22 may have different lengths dependent upon the fiber optic cable to be wound upon the fiber optic cable winding tool 10, and the desired winding shape. For example, if an elliptical or oval winding is desired, then one linkage arm 22 would be shorter than the other linkage arm 22.

Alternatively, T-shaped slide block 24 and linkage arms 22 need not be provided if a lock bolt 30 and lock arm 32 combination are provided on both slide plate carriages 16. However, in order to provide a circular winding of fiber optic cable, the user must ensure that spools 14 and carriages 16 are provided and locked in place an equal distance from the center of base 12. If T-shaped block 24 and linkage arms 22 are not provided, then multiple spools 14 (thirds, quarters, etc.) may be employed in tool 10. However, each spool 14 would need a lock bolt 30 and lock arm 32 combination.

As shown in FIG. 3, predetermined spool diameters may be set by providing a hole 23 in T-shaped slide block 24 that aligns with holes 25 provided in T-shaped slot 28. Once the desired diameter is set by aligned hole 23 with one of holes 25, a pin may be provided in holes 23,25 to prevent T-shaped slide block 24 from sliding in T-shaped slot 28. Preferably, holes 25 are formed at locations to provide a fiber optic cable winding having a diameter between 2 and 4.75 inches, although the dimensions of tool 10 may be altered to provide other diameter windings. Although only three holes 25 are shown in FIG. 3, more or less than three preset winding diameters may be provided by providing more or less than three holes 25 in T-shaped slot 28.

Figure 2:
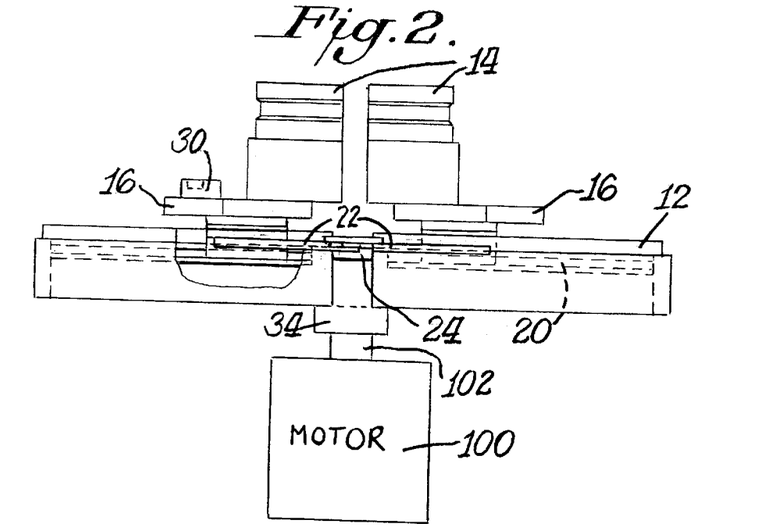
FIG. 2 is a front elevational view of the fiber optic cable winding tool shown in FIG. 1.

As shown in FIGS. 2 and 5, a motor 100 and a shaft 102 rotatably connected to motor 100 may connect to a collar 34 integrally formed with or connected to disk-shaped base 12. After the desired diameter of spools 14 has been set, motor 100 may be energized, causing shaft 102 to rotate, which, in turn, causes collar 34 and base 12 to rotate. This permits a fiber optic cable to be wound upon spools 14 quickly and easily. Alternatively, motor 100, shaft 102, and collar 34 need not be provided, and the user of fiber optic cable winding tool 10 may hand wind the fiber optic cable onto spools 14.

Significantly, tool 10 may be collapsed for easy removal of the fiber optic cable, which prevents damage to the fragile fiber optic cable. Once the fiber optic cable spool is wound on tool 10, lock bolt 30 and lock arm 32 may be disengaged, and the pin may be removed from holes 23, 25 that spools 14 may be moved adjacent to each, collapsing the diameter of spools 14 supporting the fiber optic cable winding. This enables the fiber optic cable winding to be easily removed from tool 10 without the potential for damage to the fiber optic cable.

FIG. 3 is a bottom plan view of fiber optic cable winding tool 10 in a collapsed position. In the collapsed position, spools 14 contact or are substantially adjacent to each other, providing the minimum diameter for the fiber optic cable to wound be thereon. In this position, T-shaped slide block 24 is adjacent to the periphery of disk-shaped base 12. Preferably, the radius of curvature R1 of fiber optic cable contacting surfaces 15 of spools 14 (as shown in FIGS. 1 and 5) will be greater than or equal to the minimum bend radius of the fiber optic cable to be wound thereon.

Figure 4:
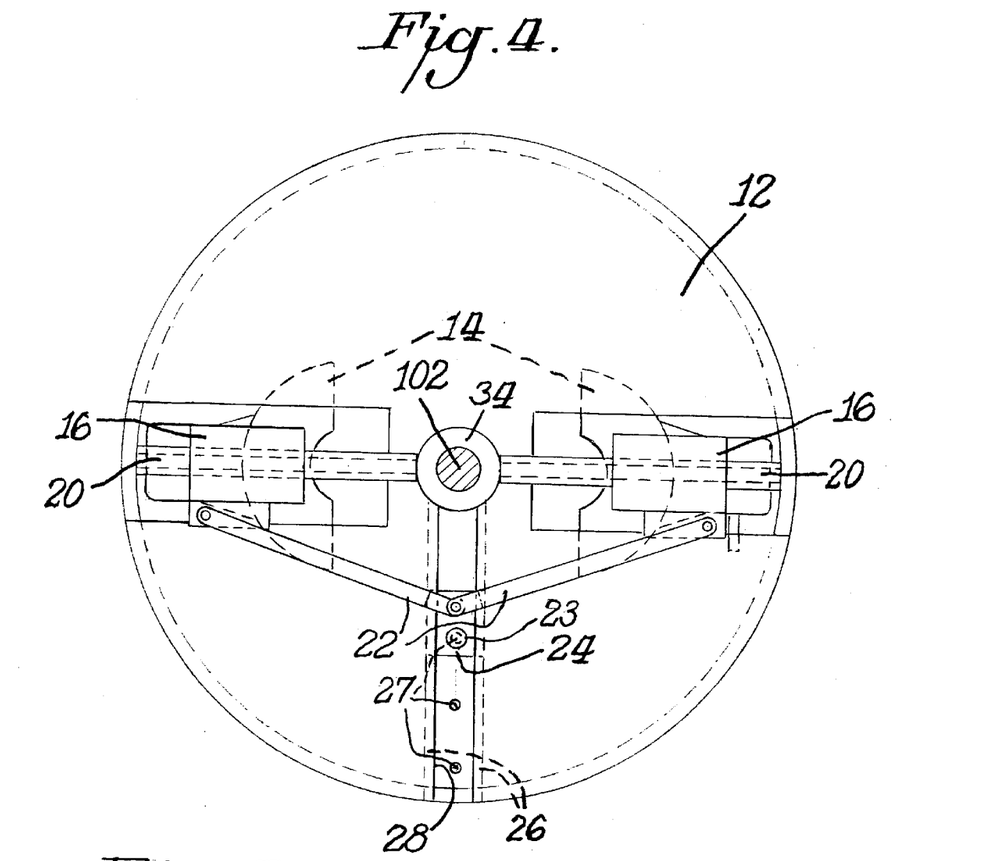
FIG. 4 is a bottom plan view of the fiber optic cable winding tool shown in FIGS. 1–3, and showing the fiber optic cable winding tool in an open position.

FIG. 4 is a bottom plan view of fiber optic cable winding tool 10 in an open position. In the open position, spools 14 are provided their maximum distance from each other, which is dependent upon the lengths of linkage arms 22. In this position, T-shaped slide block 24 is adjacent to the center of disk-shaped base 12.

Various modifications may be made in the fiber optic cable winding tool 10 shown in FIGS. 1–5. For example, base 12 and spools 14 need not be circular in shape, and may be elliptical, oval, etc. Furthermore, fiber optic cable winding tool 10 may be made from a variety of materials, including, but not limited to, 6061 and 2024 aluminum, hard-coated or anodized aluminum, and 300 and 400 series stainless steel. High performance thermoplastics such as polyvinyl chloride (PVC), acrylonitrile butadiene styrene (ABS) plastic, polycarbonate, Delrin® (registered trademark of E. I. du Pont de Nemours and Company for its brand of acetal resin), and nylon, are also possible for certain elements.

Finally, the fiber optic cable winding tool 10 may have a variety of sizes, depending upon the type of fiber optic cable to be wound thereon. Preferably, however, tool 10 is sized so that the radius of curvature R1 of fiber optic cable contacting surfaces 15 of spools 14 is greater than or equal to the minimum bend radius of the fiber optic cable, so to prevent latent defects or destruction of the fiber optic cable.

Figure 6:
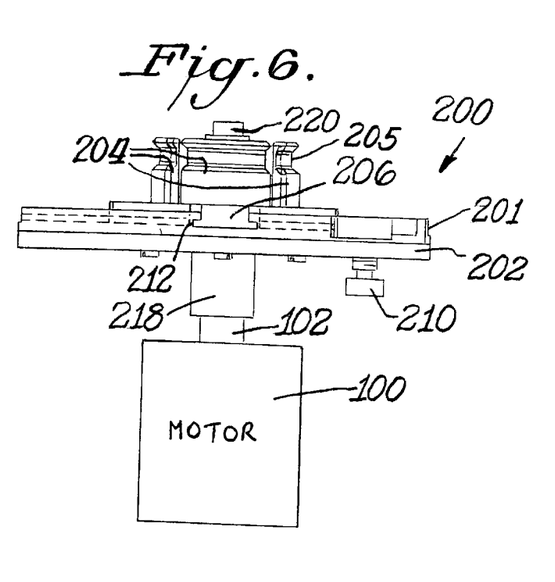
FIG. 6 is a front elevational view of a fiber optic cable winding tool in accordance with a second embodiment of the present invention.

A second embodiment of the fiber optic cable winding tool of the present invention is illustrated in FIGS. 6–10, and shown generally as reference numeral 200. Fiber optic cable winding tool 200 includes a pair of concentric disks 201, 202 capable of rotating relative to each other. Disk 201 has four quarter-circular spools (hubs, jaws, reels, etc.) 204 moveably attached thereto with four T-shaped slide carriages 206. Each spool 204 may attach to its corresponding T-shaped slide carriage 206 via various connection mechanisms. For example, each spool 204 may connect to its corresponding T-shaped slide carriage 206 with an adhesive, glue, double-sided tape, nuts and bolts, screws, etc. As shown in FIG. 6, however, each spool 204 may be integrally formed with its corresponding T-shaped slide carriage 206.

Figure 9:
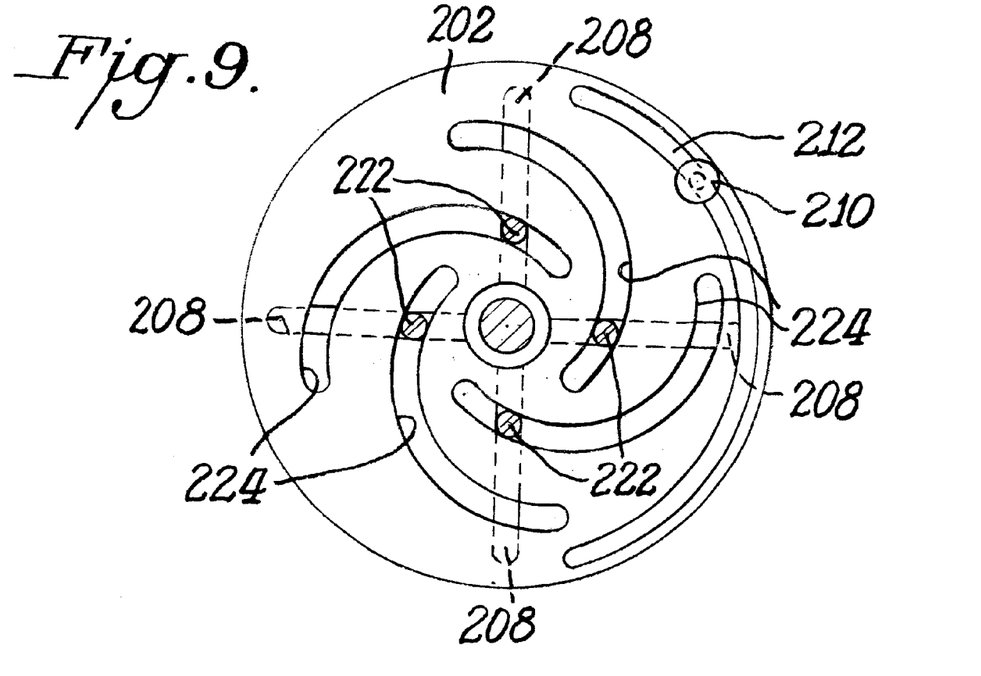
FIG. 9 is a bottom plan view of the fiber optic cable winding tool shown in FIGS. 6–8, and showing the fiber optic cable winding tool in a collapsed position.

Each T-shaped slide carriage 206 may slidably move towards and away from the other slide cartridges 206 within a corresponding T-shaped slot 207 formed in disk 201 and which radially extends away from the center of disk 201. Each T-shaped slot 207 has a radial slot 208 formed therethrough that communicates with a corresponding arcuate slot 224 formed through disk 202, as best seen in FIG. 9. A roller guide 222 (as shown in FIG. 9) may be slidably provided in each arcuate slot 224, and connect to the bottom of a corresponding T-shaped slide carriage 206. Roller guides 222 may take many forms, including a pin, a bolt, etc. However, as shown in the Figures, roller guides 222 are ball bearings that are received and retained in an opening formed in the bottoms of corresponding slide carriages 206.

Another arcuate slot 212 is formed near the periphery of a portion of disk 202, and a thumb screw 210 may be slidably provided in arcuate slot 212. Arcuate slot 212 and thumb screw 210, when loosened, enables disks 201, 202 to be rotated concentrically relative to each other, and thumb screw 210, when tightened, prevents disks 201, 202 from rotating relative to each other. This enables a user to set the diameter of the fiber optic cable to be wound upon tool 200. A user of the fiber optic cable winding tool 200 need only loosen thumb screw 210 and rotate disks 201,202 relative to each other to a desired location. This, in turn, causes roller guides 222 to move in radial slots 208 and arcuate slots 224. By way of example only and assuming spools 204 are aligned near the center of disk 201, if the user rotates disk 201 clockwise and disk 202 counterclockwise, then roller guides 22 move clockwise through arcuate slots 224, causing slide carriages 206 and spools 204 to move radially away from the center of disk 201. If disk 201 is rotated counterclockwise and disk 202 clockwise, then spools 204 move radially toward the center of disk 201. This way, spools 204 are radially adjustable towards and away from each other on disk 201. Alternatively, arcuate slots 224 may be inverted so that the rotation directions of disks 201, 202, discussed above, may be inverted.

Figure 7:
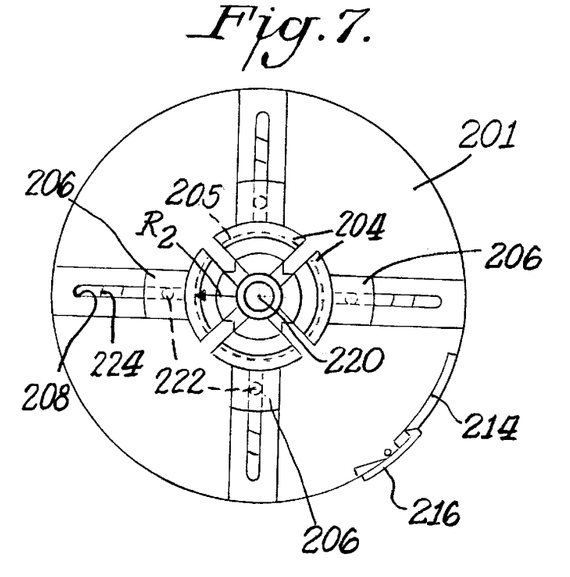
FIG. 7 is a top plan view of the fiber optic cable winding tool shown in FIG. 6.
Figure 7A:
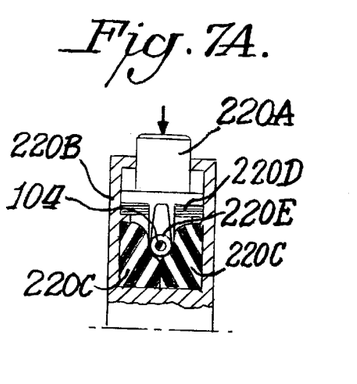
FIG. 7A is fragmental cross-sectional view in elevation showing a retaining mechanism of the fiber optic cable winding tool shown in FIGS. 6 and 7.

As shown in FIG. 7A, tool 200 further includes a mechanism 220 that retains one end of the fiber optic cable before winding begins. Mechanism 220 includes a button 220A slidably provided within a cylinder 220B having an opening 220E provided therethrough for receiving one end of a fiber optic cable 104. A pair of resilient (e.g., rubber) disks 220C are provided within cylinder 220B, and are spring-biased by a spring 220D. To load fiber optic cable 104, button 220A is depressed, spring 220D spreads resilient disks 220C, the fiber optic cable 104 is inserted into opening 220E between the disks 220C, and button 220A is released. This sandwiches the fiber optic cable 104 between the resilient disks 220C and secures it for spooling.

Once the user is satisfied with the diameter created by spools 204, he or she need only tighten thumb screw 210. Once thumb screw 210 tightened, it retains and prevents disk 201 from rotating relative to disk 202, which prevents spools 204 from moving radially inward or outward. Thus, thumb screw 210 retains the desired diameter of spools 204. Preferably, arcuate slots 224 have the same length and shape so that spools 204 move away from the center of disk 201 an equal distance. However, arcuate slots 224 may have different lengths and shapes dependent upon the fiber optic cable to be wound upon the fiber optic cable winding tool 200, and the desired winding shape. For example, if an elliptical or oval winding is desired, then two arcuate slots 224 would be shorter than the other two arcuate slots 224. Furthermore, reference marks may be provided on disk 201 that allow the user to set predetermined diameters for spools 204.

Preferably, a stop slot 214 having a plurality of holes at predetermined locations may be formed on the circumference of disk 201. The holes of stop slot 214 may receive a travel stop guide 216 connected to disk 202 so that predetermined spool diameters may be set. A desired diameter is set by providing stop guide 216 within one of the holes provided in stop slot 214. Preferably, the holes of stop slot 214 are formed at locations to provide a fiber optic cable winding having a diameter between 2 and 4.75 inches, although the dimensions of tool 200 may be altered to provide other diameter windings. Any number of holes maybe provided in stop slot 214, depending upon the number of predetermined spool diameters desired.

Significantly, tool 200 may be collapsed for easy removal of the fiber optic cable, which prevents damage to the fragile fiber optic cable. Once the fiber optic cable is wound, thumb screw 210, stop slot 214, and travel stop guide 216 may be disengaged to permit disks 201, 202 to rotate relative to one another, collapsing the diameter of spools 204 supporting the fiber optic cable winding. This enables the fiber optic cable winding to be easily removed from tool 200 without the potential for damage to the fiber optic cable. Travel stop guide 216 is then reset into stop slot 214 and a new winding can be wound on tool 200.

The diameter of disks 201,202, the length of arcuate slot 212, and the lengths of radial slots 208 and arcuate slots 224 will determine the maximum diameter formed by spools 204, dependent upon the fiber optic cables to be wound on tool 200. Furthermore, although four spools 204 are shown in FIGS. 6–10, more or less spools (thirds, fifths, etc.) may be employed in tool 200.

Figure 8:
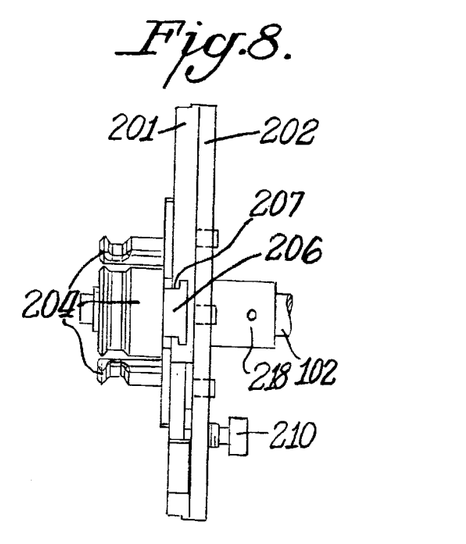
FIG. 8 is a side elevational view of the fiber optic cable winding tool shown in FIGS. 6 and 7.

As shown in FIGS. 6 and 8, a motor 100 and a shaft 102 rotatably connected to motor 100 may connect to a collar 218 integrally formed with or connected to disk 202. After the desired diameter of spools 204 has been set, motor 100 may be energized, causing shaft 102 to rotate, which, in turn, causes collar 218 and disks 201, 202 to rotate. This permits a fiber optic cable to be wound upon spools 204 quickly and easily. Alternatively, motor 100, shaft 102, and collar 218 need not be provided, and the user of fiber optic cable winding tool 200 may hand wind the fiber optic cable onto spools 204.

FIG. 9 is a bottom plan view of fiber optic cable winding tool 200 in a collapsed position. In the collapsed position, spools 204 contact or are substantially adjacent to each other, providing the minimum diameter for the fiber optic cable to be wound thereon. In this position, all of the roller guides 222 are adjacent to the center of disk 202. Preferably, the radius of curvature R2 of fiber optic cable contacting surfaces 205 of spools 204 will be greater than or equal to the minimum bend radius of the fiber optic cable to be wound thereon.

Figure 10:
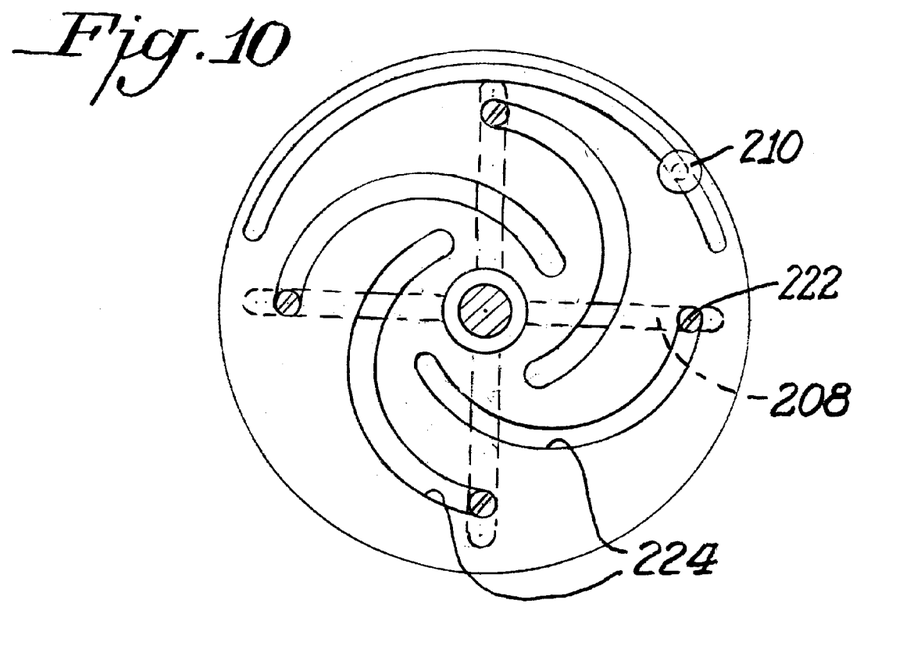
FIG. 10 is a bottom plan view of the fiber optic cable winding tool shown in FIGS. 6–9, and showing the fiber optic cable winding tool in an open position.

FIG. 10 is a bottom plan view of fiber optic cable winding tool 200 in an open position. In the open position, spools 204 are provided at their maximum distance from each other, which is dependent upon the size and shape of disks 201, 202, arcuate slot 212, and arcuate slots 224. In this position, roller guides 222 are adjacent to the periphery of disk 202.

Various modifications may be made in the fiber optic cable winding tool 200 shown in FIGS. 6–10. For example, disks 201, 202 and spools 204 need not be circular in shape, and may be elliptical, oval, etc. Furthermore, fiber optic cable winding tool 200 may be made from a variety of materials, including, but not limited to, the materials mentioned above for tool 10 shown in FIGS. 1–5. Finally, the fiber optic cable winding tool 200 may have a variety of sizes, depending upon the type of fiber optic cable to be wound thereon. For example, disks 201, 202 may have diameters of approximately six inches, but larger diameter disks 201, 202 maybe used if larger diameter spools are required. Preferably, however, tool 200 is sized so that the radius of the fiber optic cable winding provided thereby is greater than or equal to the minimum bend radius of the fiber optic cable, so to prevent latent defects or destruction of the fiber optic cable.

Figures 11, 12, 13, 14:
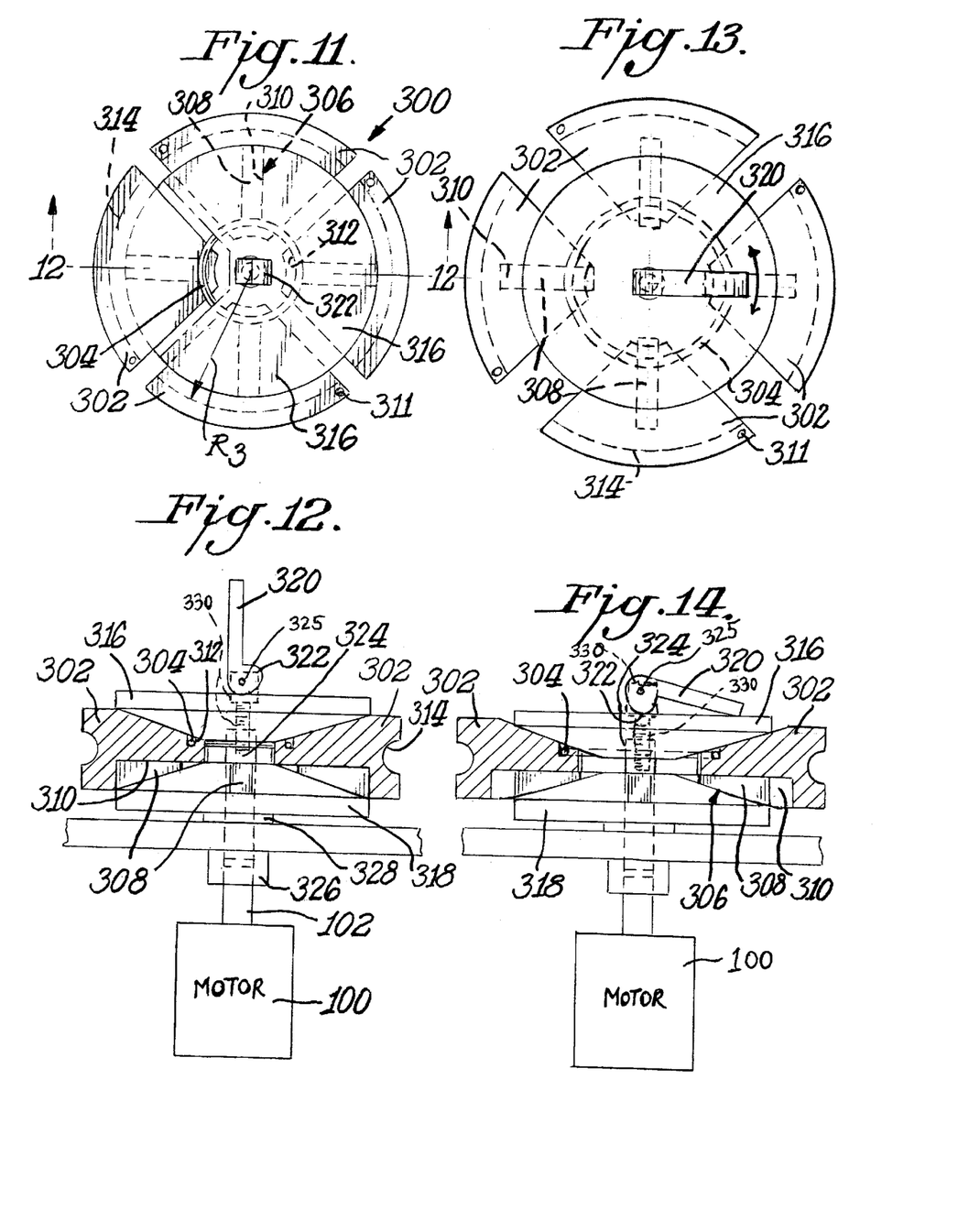
FIG. 11 is a top plan view partially broken away of a fiber optic cable winding tool in accordance with a third embodiment of the present invention, and showing the fiber optic cable winding tool in a collapsed position.
FIG. 12 is a cross-sectional view in elevation of the fiber optic cable winding tool taken along line 12—12 of FIG. 11.
FIG. 13 is a top plan view partially broken away of the fiber optic cable winding tool shown in FIGS. 11 and 12, and showing the fiber optic cable winding tool in an open position.
FIG. 14 is a cross-sectional view in elevation of the fiber optic cable winding tool taken along line 14—14 of FIG. 13.

A third embodiment of the fiber optic cable winding tool of the present invention is illustrated in FIGS. 11–14, and shown generally as reference numeral 300. Fiber optic cable winding tool 300 includes four quarter-circular spools (hubs, jaws, reels, etc.) 302 moveably attached together with a resilient ring 304, such as a resilient O-ring. Each spool 302 may have an opening 311 provided therein for receiving and retaining one end of the fiber optic cable to be wound thereon before the winding is begun. A central disk-shaped base (hub, drive dog, etc.) 306 having four radial guides (translation spokes, etc.) 308 may be provided centrally to each spool 302. Each spool 302 includes a guide slot 310 that slidably receives a corresponding radial guide 308. Resilient ring 304 inwardly biases each spool 302 onto its corresponding radial guide 308, retaining spools 302 on drive dog 306. As best seen in FIG. 12, each spool 302 contains a slot 312 that receives resilient ring 304 therein, and further includes a groove 314 for retaining a fiber optic cable thereagainst.

Figure 12A:
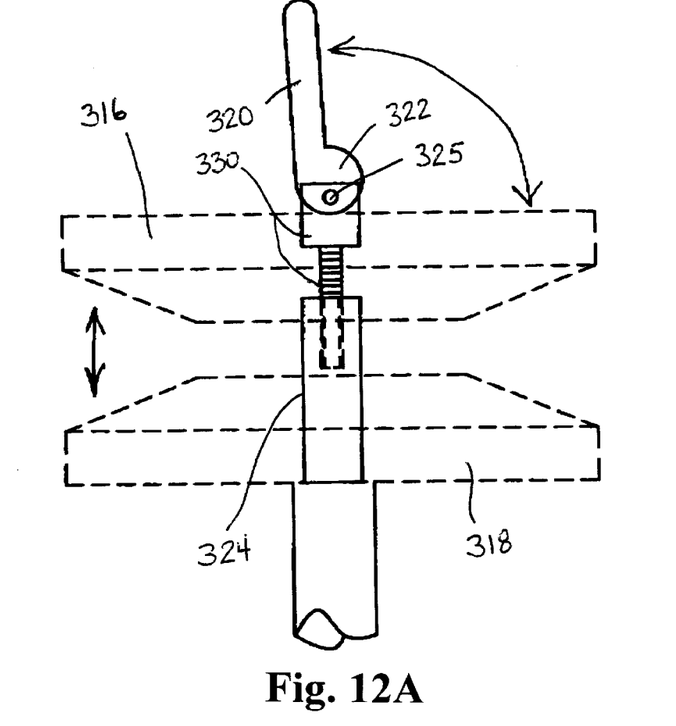
FIG. 12A is a side view of portions of the fiber optic cable winding tool shown in FIG. 11.
Figure 14A:
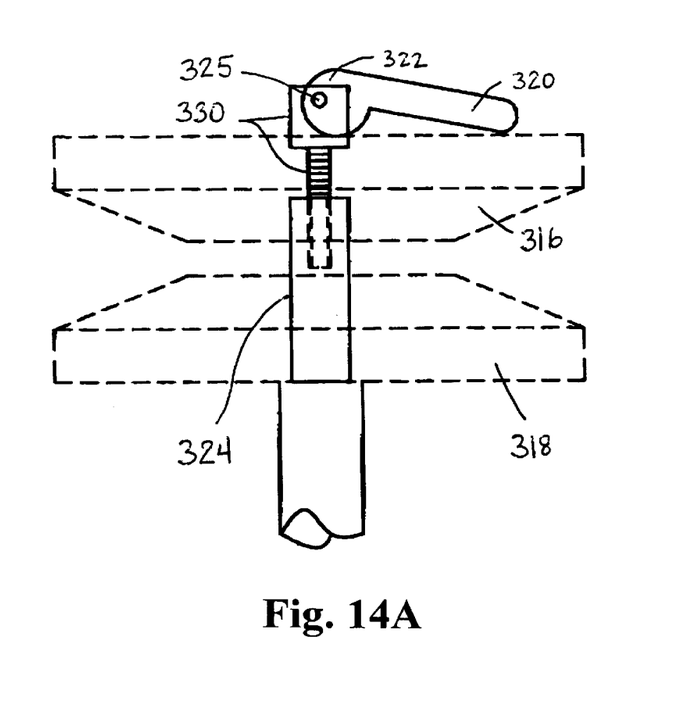
FIG. 14A is a side view of portions of the fiber optic cable winding tool shown in FIG. 13.

Fiber optic cable winding tool 300 further includes a radial guide or shaft 324 upon which disk-shaped base 306, an upper wedge-shaped disk 316, and a lower wedge-shaped disk 318 are centrally and concentrically mounted with each other. Both upper and lower disks 316,318 may be movable on radial shaft 324, or one disk may be moveable and the other disk stationary. As shown in FIG. 12, upper disk 316 is moveable towards and away from stationary lower disk 318 (stationary on radial shaft 324) through activation of a cam lever 320 integrally connected to a cam lobe 322. Cam lobe 322 pivotally attaches to the head portion of a cap screw 330, via pivot pin 325. A threaded portion of cap screw 330 threadably connects to radial shaft 324, as best shown in FIGS. 12A and 14A.

Cam lever 320, cam lobe 322, and cap screw 330 enable a user to set the diameter of the fiber optic cable to be wound upon tool 300. A user of the fiber optic cable winding tool 300 need only feed the fiber optic cable in one of the openings 311 formed in one of the spools 302, and rotate cam lever 320 clockwise. As best seen in FIGS. 12A and 14A, rotation of cam lever 320 clockwise causes cap screw 330 to be threaded down into radial shaft 324. This, in turn, causes upper disk 316 to move towards lower disk 318, forcing spools 302 radially away from the central radial guide 314 against the inward biasing force of resilient ring 304. If cam lever 320 is rotated counterclockwise, then cap screw 330 is threaded away from radial shaft 324, upper disk 316 moves away from lower disk 318, and the inward biasing force of resilient ring 304 causes spools 302 to move radially toward the center of radial shaft 324. This way, spools 302 are radially adjustable towards and away from each other. Alternatively, the threaded portion of cap screw 330 may be inverted (e.g., from left-handed threading to right-handed threading) so that the rotation directions of cam lever 320 discussed above may be inverted.

A desired diameter maybe set by locking cam lobe 322 and cap screw 330 at a specific location. Preferably, tool 300 provides a fiber optic cable winding having a diameter between 2 and 4.75 inches, although the dimensions of tool 300 may be altered to provide other diameter windings.

Preferably, spools 302 have the same shape, and upper disk 316 uniformly engages spools 302 so that spools 302 move away from the center radial guide 324 an equal distance. However, spools 302 may have different shapes dependent upon the fiber optic cable to be wound upon the fiber optic cable winding tool 300, and the desired winding shape. For example, if an elliptical or oval winding is desired, then two spools 302 would have shorter radii than the other two spools 302.

Significantly, tool 300 may be collapsed for easy removal of the fiber optic cable, which prevents damage to the fragile fiber optic cable. Once the fiber optic cable is wound, cam lever 320 is flipped upward, as best shown in FIGS. 12 and 12A, and the geometry of cam lobe 322 collapses the diameter of spools 302 supporting the fiber optic cable winding. This enables the fiber optic cable winding to be easily removed from tool 300 without the potential for damage to the fiber optic cable. A fiber optic cable may then be provided in an opening 311 of a spool 302, and a new winding can be wound on tool 300.

The shapes of spools 302, upper disk 316, and cam lobe 322 will determine the maximum diameter formed by spools 302, which is dependent upon the fiber optic cables to be wound on tool 300. Furthermore, although four spools 302 are shown in FIGS. 11–14, more or less spools (thirds, fifths, etc.) may be employed in tool 300.

As shown in FIGS. 12 and 14, a motor 100 and a shaft 102 rotatably connected to motor 100 may connect to a collar 326 integrally formed with or connected to support 328 extending from lower disk 318. After the desired diameter of spools 302 has been set, motor 100 may be energized, causing shaft 102 to rotate, which, in turn, causes collar 326, lower disk 318, and spools 302 to rotate. This permits a fiber optic cable to be wound upon spools 302 quickly and easily. Alternatively, motor 100, shaft 102, and collar 326 need not be provided, and the user of fiber optic cable winding tool 300 may hand wind the fiber optic cable onto spools 302.

FIGS. 11 and 12 show fiber optic cable winding tool 300 in a collapsed position. In the collapsed position, spools 302 contact or are substantially adjacent to drive dog 306, providing the minimum diameter for the fiber optic cable to be wound thereon. Preferably, the radius of curvature R3 of fiber optic cable contacting surfaces (grooves 314) of spools 302 will be greater than or equal to the minimum bend radius of the fiber optic cable to be wound thereon.

FIGS. 13 and 14 show fiber optic cable winding tool 300 in an open position. In the open position, spools 302 are provided at their maximum distance from each other, which is dependent upon the size and shape of spools 302, upper disk 316, and cam lobe 322.

Various modifications may be made in the fiber optic cable winding tool 300 shown in FIGS. 11–14. For example, spools 302 need not be circular in shape, and may be elliptical, oval, etc. Furthermore, fiber optic cable winding tool 300 may be made from a variety of materials, including, but not limited to, the materials mentioned above for tool 10 shown in FIGS. 1–5. Finally, the fiber optic cable winding tool 300 may have a variety of sizes, depending upon the type of fiber optic cable to be wound thereon. For example, tool 300 is sized so that the radius of the fiber optic cable winding provided thereby is greater than or equal to the minimum bend radius of the fiber optic cable, so to prevent latent defects or destruction of the fiber optic cable.

Figure 15:
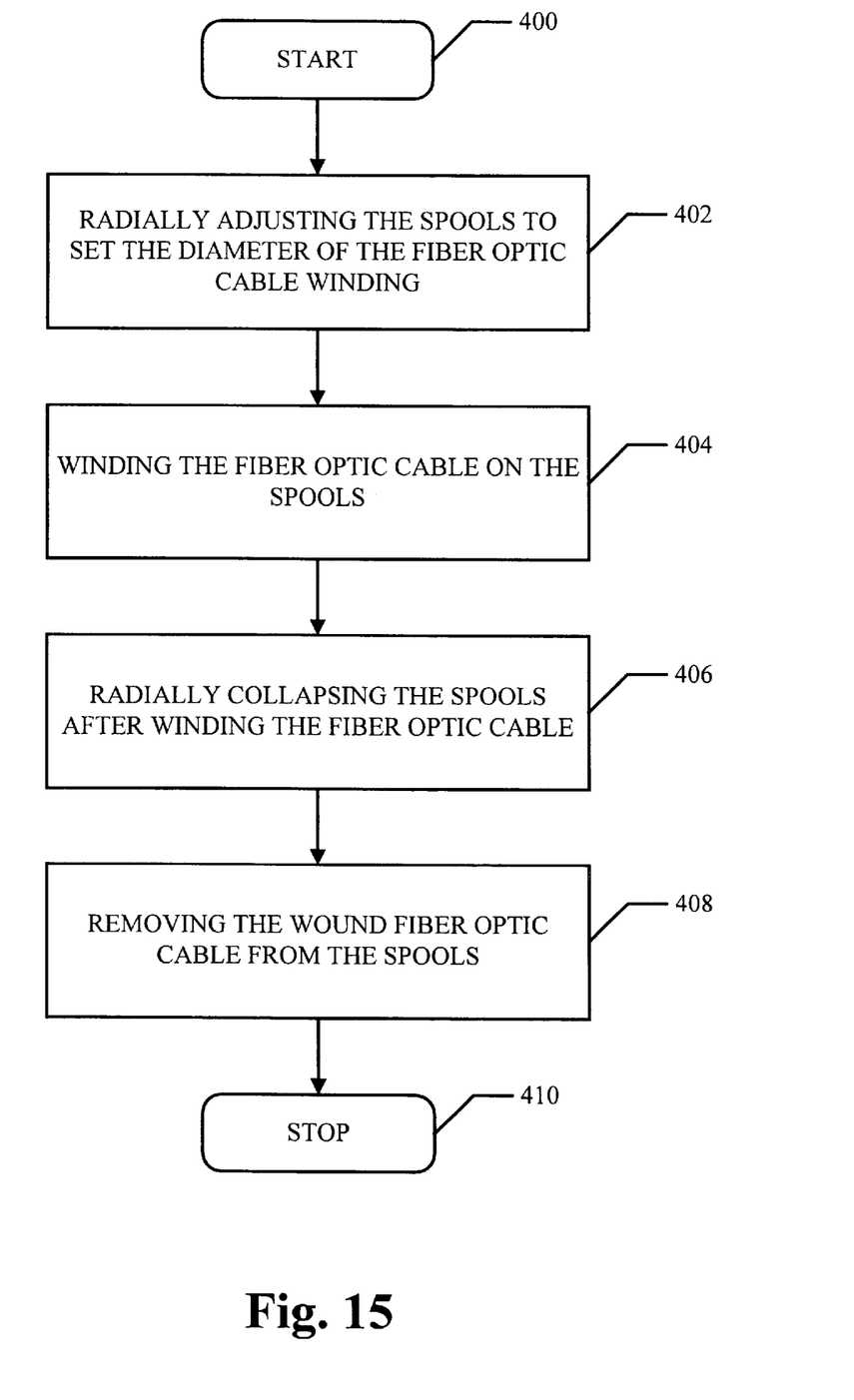
FIG. 15 is a flow chart showing a method of using the first, second, and third embodiments of the fiber optic cable winding tool of the present invention.

FIG. 15 is a flow chart showing a method of using the fiber optic cable winding tools of the present invention that may be applied to all three embodiments of the tool (e.g., tools 10, 20, 300). The method begins at step 400, and includes a first step 402 of radially adjusting the spools of the fiber optic cable winding tool to set the diameter of the fiber optic cable spool or winding. The method further includes a second step 404 of winding the fiber optic cable on the spools, a third step 406 of radially collapsing the spools after winding the fiber optic cable, and a fourth step 408 of removing the wound fiber optic cable from the spools. The method concludes after fourth step 408, at step 410.

In addition to the method shown in FIG. 15, multiple mechanisms that retain one end of the fiber optic cable prior to winding may be used with all three embodiments of the fiber optic cable winding tool. For example, the mechanism 220 shown in FIG. 7A, tape, adhesive, a screw having a resilient washer, etc. may be used with all three tools 10, 200, 300.

The fiber optic cable winding tool of the present invention provides many advantages over the conventional storage means previously described. For example, the winding tool of the present invention provides a safe means for providing accurate predetermined lengths fiber optic cables in optical communications systems that may be quickly and easily utilized by an operator, eliminate unused cable lengths, and prevent the fiber optic cables from being damaged or bent beyond their minimum bend radii. The winding tool also enables winding fiber spools having various diameters without the need to change the spool. Significantly, the winding tools of the present invention may be collapsed for easy removal of the fiber optic cable, which prevents damage to the fragile fiber optic cable.

It will be apparent to those skilled in the art that various modifications and variations can be made in the fiber optic cable winding tool of the present invention and in construction of the winding tool without departing from the scope or spirit of the invention. The physical dimensions of the components of the present invention may vary depending upon the amount and size of the fiber optic cable to be retained therein. Furthermore, the number and shape of the spools, material selections, etc., discussed above and shown in the Figures, are purely exemplary and not limiting of the embodiments of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fiber optic cable winding tool comprising:
   an upper disk-shaped base having a central axis;
   a lower disk-shaped base concentric with and rotatable relative to said upper disk-shaped base;
   a plurality of spools, each spool having a fiber optic cable contacting surface with a radius of curvature exceeding a minimum bend radius of the fiber optic cable, each spool slidably mounting on a radial slot formed on said upper disk-shaped base, said lower disk-shaped base having a plurality of arcuate slots that communicate with corresponding radial slots and spools such that said plurality of spools are radially adjustable relative to the central axis of said upper disk-shaped base; and
   a roller guide provided on each of said plurality of spools and communicating with corresponding radial and arcuate slots;
   wherein said roller guides and the radial and arcuate slots permit said plurality of spools to be radially collapsed towards the central axis of said upper disk-shaped base after winding the fiber optic cable on said plurality of spools to permit removal of the wound fiber optic cable from said plurality of spools.

2. A fiber optic cable winding tool as recited in claim 1, further comprising a travel stop guide formed on the periphery of said upper disk-shaped base to prevent said upper and lower disk-shaped bases from rotating relative to each other, wherein releasing said travel stop guide permits said plurality of spools to be radially collapse towards the central axis of said upper disk-shaped base.

3. A fiber optic cable winding tool as recited in claim 1, further comprising a thumb screw provided through one of the plurality of arcuate slots to prevent said upper and lower disk-shaped bases from rotating and to secure said plurality of spools.

4. A fiber optic cable winding tool as recited in claim 1, wherein said travel stop guide may be fixed at a plurality of predetermined locations on the periphery of said upper disk-shaped base that correspond to predetermined diameters for the fiber optic cable winding.

5. A fiber optic cable winding tool as recited in claim 1, wherein each of said plurality of spools is quarter-circular in shape.

6. A fiber optic cable winding tool as recited in claim 1, wherein the diameter of the fiber optic cable winding can be increased by rotating said upper and lower disk-shaped bases relative to each other to move said plurality of spools away from the central axis of said upper disk-shaped base.

7. A fiber optic cable winding tool as recited in claim 1, wherein said plurality of spools comprises four spools.

8. A fiber optic cable winding tool as recited in claim 1, further comprising a mechanism that retains one end of the fiber optic cable before winding of the fiber optic cable begins.

9. A fiber optic cable winding tool as recited in claim 8, wherein the retaining mechanism comprises a button slidably provided within a cylinder having an opening provided therethrough for receiving one end of the fiber optic cable, and a pair of spring-biased resilient disks provided within the cylinder, wherein when the button is depressed, the resilient disks are spread, the fiber optic cable is inserted into the opening of the cylinder, between the resilient disks, the button is released, and the fiber optic cable is retained between the resilient disks.

10. A fiber optic cable winding tool as recited in claim 1, further comprising a motor operably connected to said lower disk-shaped base for rotating said upper and lower disk-shaped bases to wind the fiber optic cable.

11. A method of using a fiber optic cable winding tool having an upper disk-shaped base with a central axis; a lower disk-shaped base concentric with and rotatable relative to the upper disk-shaped base; a plurality of spools, each spool having a fiber optic cable contacting surface with a radius of curvature exceeding a minimum bend radius of the fiber optic cable, each spool slidably mounting on a radial slot formed on the upper disk-shaped base, the lower disk-shaped base having a plurality of arcuate slots that communicate with corresponding radial slots and spools such that the plurality of spools are radially adjustable relative to the central axis of the upper disk-shaped base; and a roller guide provided on each of the plurality of spools and communicating with corresponding radial and arcuate slots, the method comprising:

radially adjusting the plurality of spools relative to the central axis of the upper disk-shaped base to set the diameter of the winding of the fiber optic cable;

winding the fiber optic cable on the plurality of spools;

radially collapsing the plurality of spools towards the central axis of the upper disk-shaped base after winding the fiber optic cable; and removing of the fiber optic cable from the plurality of spools.

12. A method of using a fiber optic cable winding tool as recited in claim 11, further comprising releasing a travel stop guide formed on the periphery of the upper disk-shaped base to permit the plurality of spools to be radially collapsed towards the central axis of the upper disk-shaped base.

13. A method of using a fiber optic cable winding tool as recited in claim 12, wherein the travel stop guide may be fixed at a plurality of predetermined locations on the periphery of the upper disk-shaped base to radially adjust the plurality of spools.

14. A method of using a fiber optic cable winding tool as recited in claim 11, further comprising fixing the upper and lower disk-shaped bases with a thumb screw provided through one of the plurality of arcuate slots to secure the plurality of spools, after radially adjusting the plurality of spools.

15. A method of using a fiber optic cable winding tool as recited in claim 11, further comprising retaining one end of the fiber optic cable prior to winding the fiber optic cable on the plurality of spools.

16. A method of using a fiber optic cable winding tool as recited in claim 11, further comprising rotating the lower disk-shaped base with a motor operably connects to the lower disk-shaped base to wind the fiber optic cable on the plurality of spools.

* * * * *